(12) United States Patent
Kariv

(10) Patent No.: US 9,317,387 B2
(45) Date of Patent: Apr. 19, 2016

(54) METHODS AND SYSTEMS FOR REDUCING METRICS USED TO MONITOR RESOURCES

(71) Applicant: VMware, Inc., Palo Alto, CA (US)

(72) Inventor: Asaf Kariv, Tel Mond (IL)

(73) Assignee: VMware, Inc., Palo Alto, CA (US)

( * ) Notice: Subject to any disclaimer, the term of this patent is extended or adjusted under 35 U.S.C. 154(b) by 207 days.

(21) Appl. No.: 13/914,873

(22) Filed: Jun. 11, 2013

(65) Prior Publication Data

US 2014/0365637 A1    Dec. 11, 2014

(51) Int. Cl.
*G06F 11/30*    (2006.01)

(52) U.S. Cl.
CPC .................................. *G06F 11/3003* (2013.01)

(58) Field of Classification Search
CPC ............ G06F 11/3003; G06F 11/3006; G06F 11/3048; G06F 11/3065; G06F 11/3072; G06F 11/3082; F06F 11/3051; F06F 11/3055
See application file for complete search history.

(56) References Cited

U.S. PATENT DOCUMENTS

2004/0236547 A1 * 11/2004 Rappaport et al. ................. 703/2
2013/0007761 A1 * 1/2013 O'Sullivan et al. ........... 718/104

* cited by examiner

*Primary Examiner* — Dac Ha

(57) ABSTRACT

Computational methods and systems for identifying a subset of a set of metrics that can be used to monitor a resource are described. The subset is representative of the information provided by the full set of metrics. Correlations are calculated for each pair of metrics and metrics with the highest correlations to other metrics in the set of metrics are deleted to obtain the representative subset of metrics. Deletion of metrics from the set of metrics may be optimized for accuracy or cost. The smaller representative subset of metrics can then be used to monitor the resource.

21 Claims, 19 Drawing Sheets

| Time | Buffer hits % | Buffer read per second | Commits per second | Connections | Connections idle | Connections usage | CPU usage | Rows read per second | Rows writen per second |
|---|---|---|---|---|---|---|---|---|---|
| $t_0$ | 0.99972 | 0.06648 | 0.78108 | 33 | 30 | 0.33 | 0.00432 | 22.71519 | 3.75534 |
| ⋮ | ⋮ | ⋮ | ⋮ | ⋮ | ⋮ | ⋮ | ⋮ | ⋮ | ⋮ |

| | Buffer hits % | Buffer read per second | Commits per second | Connections | Connections idle | Connections usage | CPU usage | Rows read per second | Rows writen per second |
|---|---|---|---|---|---|---|---|---|---|
| Buffer hits % | 1 | NaN | NaN | NaN | NaN | NaN | NaN | NaN | NaN |
| Buffer read per second | NaN | 1 | -0.06 | -0.07 | -0.09 | -0.07 | 0.1 | -0.07 | 0.04 |
| Commits per second | NaN | -0.06 | 1 | 0.81 | 0.5 | 0.81 | 0.11 | 0.32 | 0.29 |
| Connections | NaN | -0.07 | 0.81 | 1 | 0.66 | 1 | 0.11 | 0.18 | 0.3 |
| Connections idle | NaN | -0.09 | 0.5 | 0.66 | 1 | 0.66 | -0.01 | -0.11 | 0.29 |
| Connections usage | NaN | -0.07 | 0.81 | 1 | 0.66 | 1 | 0.11 | 0.18 | 0.3 |
| CPU usage | NaN | 0.1 | 0.11 | 0.11 | -0.01 | 0.11 | 1 | 0.04 | -0.01 |
| Rows read per second | NaN | -0.07 | 0.32 | 0.18 | -0.11 | 0.18 | 0.04 | 1 | 0.21 |
| Rows writen per second | NaN | 0.04 | 0.29 | 0.3 | 0.29 | 0.3 | -0.01 | 0.21 | 1 |

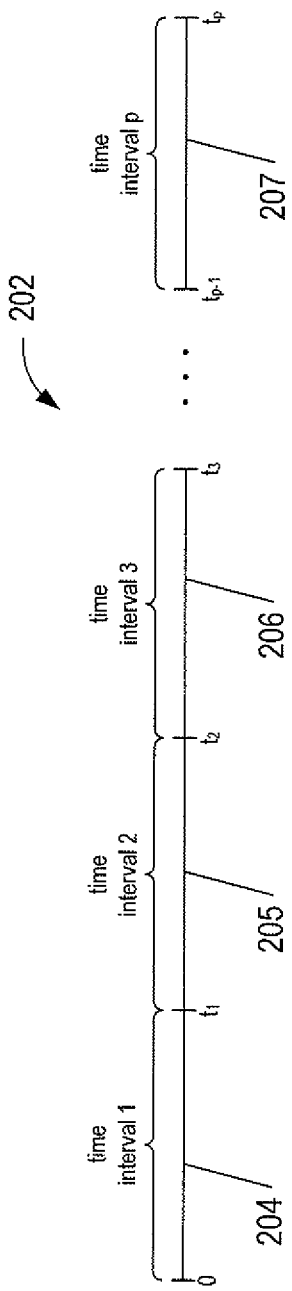

| $m_1$ | $m_2$ | $m_3$ | ... | $m_i$ | ... | $m_n$ |
|---|---|---|---|---|---|---|
| $m_1$ | corr($m_1,m_1$) | corr($m_1,m_2$) | corr($m_1,m_3$) | ... | corr($m_1,m_i$) | ... | corr($m_1,m_n$) |
| $m_2$ | corr($m_2,m_1$) | corr($m_2,m_2$) | corr($m_2,m_3$) | ... | corr($m_2,m_i$) | ... | corr($m_2,m_n$) |
| $m_3$ | corr($m_3,m_1$) | corr($m_3,m_2$) | corr($m_3,m_3$) | ... | corr($m_3,m_i$) | ... | corr($m_3,m_n$) |
| ... | ... | ... | ... | ⋱ | ... | | ... |
| $m_i$ | corr($m_i,m_1$) | corr($m_i,m_2$) | corr($m_i,m_3$) | ... | corr($m_i,m_i$) | ... | corr($m_i,m_n$) |
| ... | ... | ... | ... | | ... | ⋰ | ... |
| $m_n$ | corr($m_n,m_1$) | corr($m_n,m_2$) | corr($m_n,m_3$) | ... | corr($m_n,m_i$) | ... | corr($m_n,m_n$) |

| | $m_1$ | $m_2$ | $m_3$ | ... | $m_i$ | ... | $m_n$ |
|---|---|---|---|---|---|---|---|
| $m_1$ | 1 | $c_{1,2}$ | $c_{1,3}$ | ... | $c_{1,i}$ | ... | $c_{1,n}$ |
| $m_2$ | $c_{2,1}$ | 1 | $c_{2,3}$ | ... | $c_{2,i}$ | ... | $c_{2,n}$ |
| $m_3$ | $c_{3,1}$ | $c_{3,2}$ | 1 | ... | $c_{3,i}$ | ... | $c_{3,n}$ |
| ... | ... | ... | ... | ... | ... | ... | ... |
| $m_j$ | $c_{1,j}$ | $c_{2,j}$ | $c_{3,j}$ | ... | 1 | ... | $c_{n,j}$ |
| ... | ... | ... | ... | ... | ... | ... | ... |
| $m_n$ | $c_{1,n}$ | $c_{2,n}$ | $c_{3,n}$ | ... | $c_{i,n}$ | ... | 1 |

| Time | Buffer hits % | Buffer read per second | Commits per second | Connections | Connections idle | Connections usage | CPU usage | Rows read per second | Rows written per second |
|---|---|---|---|---|---|---|---|---|---|
| $t_0$ | 0.99972 | 0.06648 | 0.78108 | 33 | 30 | 0.33 | 0.00432 | 22.71519 | 3.75534 |
| ... | ... | ... | ... | ... | ... | ... | ... | ... | ... |

FIG. 9A

|  | Buffer hits % | Buffer read per second | Commits per second | Connections | Connections idle | Connections usage | CPU usage | Rows read per second | Rows written per second |
|---|---|---|---|---|---|---|---|---|---|
| Buffer hits % | 1 | NaN | NaN | NaN | NaN | NaN | NaN | NaN | NaN |
| Buffer read per second | NaN | 1 | -0.06 | -0.07 | -0.09 | -0.07 | 0.1 | -0.07 | 0.04 |
| Commits per second | NaN | -0.06 | 1 | 0.81 | 0.5 | 0.81 | 0.11 | 0.32 | 0.29 |
| Connections | NaN | -0.07 | 0.81 | 1 | 0.66 | 1 | 0.11 | 0.18 | 0.3 |
| Connections idle | NaN | -0.09 | 0.5 | 0.66 | 1 | 0.66 | -0.01 | -0.11 | 0.29 |
| Connections usage | NaN | -0.07 | 0.81 | 1 | 0.66 | 1 | 0.11 | 0.18 | 0.3 |
| CPU usage | NaN | 0.1 | 0.11 | 0.11 | -0.01 | 0.11 | 1 | 0.04 | -0.01 |
| Rows read per second | NaN | -0.07 | 0.32 | 0.18 | -0.11 | 0.18 | 0.04 | 1 | 0.21 |
| Rows written per second | NaN | 0.04 | 0.29 | 0.3 | 0.29 | 0.3 | -0.01 | 0.21 | 1 |

FIG. 9B

| | Busy Workers | Idle Workers | Requests served per second | Bytes Served | Bytes served per minute | Bytes served per request | Bytes served per second | Requests served | Requests served per minute | Server uptime |
|---|---|---|---|---|---|---|---|---|---|---|
| Busy Workers | 1 | -1 | 0.34 | -0.34 | 0.02 | NaN | 0.34 | -0.34 | 0.02 | -0.34 |
| Idle Workers | -1 | 1 | -0.34 | 0.34 | -0.02 | NaN | -0.34 | 0.34 | -0.02 | 0.34 |
| Requests served per second | 0.34 | -0.34 | 1 | -1 | -0.01 | NaN | 1 | -1 | 0 | -1 |
| Bytes Served | -0.34 | 0.34 | -1 | 1 | 0.01 | NaN | -1 | 1 | 0 | 1 |
| Bytes served per minute | 0.02 | -0.02 | -0.01 | 0.01 | 1 | NaN | -0.01 | 0.01 | -0.03 | 0.01 |
| Bytes served per request | NaN | NaN | NaN | NaN | NaN | 1 | NaN | NaN | NaN | NaN |
| Bytes served per second | 0.34 | -0.34 | 1 | -1 | -0.01 | NaN | 1 | -1 | 0 | -1 |
| Requests served | -0.34 | 0.34 | -1 | 1 | 0.01 | NaN | -1 | 1 | 0 | 1 |
| Requests served per minute | 0.02 | -0.02 | 0 | 0 | -0.03 | NaN | 0 | 0 | 1 | 0 |
| Server uptime | -0.34 | 0.34 | -1 | 1 | 0.01 | NaN | -1 | 1 | 0 | 1 |

FIG. 10B

METHODS AND SYSTEMS FOR REDUCING METRICS USED TO MONITOR RESOURCES

TECHNICAL FIELD

This disclosure relates to computational systems and methods for reducing the number of metrics used to monitor computer resources.

BACKGROUND

Computer resources are typically monitored to evaluate performance and assess how certain resources perform with respect to different operations. A computer resource can be monitored by generating one or more metrics that indicate how often or much particular components of the resource are used over time. For example, the metrics typically collected for a server over time may be the average number of times a buffer is accessed, the number of times certain connections are used or idle, electrical power consumption, network throughput, hard disk space, and processor time. After multiple metrics have been collected, the metrics can be evaluated to assess the performance of individual components of a resource or the metrics can be used to track the performance of the resource. For example, the same metrics collected for various servers can be used to compare how different servers perform when executing the same set of instructions.

However, many resource monitoring applications use a large number of metrics which, in turn, creates problems for resource users. For example, a resource user trying to determine which of a large number of metrics to select in order to assess performance of the resource may be overwhelmed and have to guess as to which metrics to collect; the large number of metrics collected increases storage requirements and, therefore, increases the cost of evaluating a resource's performance; and, when monitoring multiple resources, the large number of metrics may reduce the scale of monitored resources and/or monitoring time when one of the resources is dedicated to monitoring the other resources. As a result, those working in the computer industry seek tools that can be used to reduce the number of metrics without sacrificing useful information that may be used to evaluate the performance of a resource.

SUMMARY

This disclosure presents computational methods and systems for identifying a subset of a set of metrics that can be used to monitor a resource in which the subset is representative of the information represented by the set of metrics. The methods and systems receive metrics values associated with a set of metrics used to monitor a resource over a sample period of time and calculate the correlation magnitude for each pair of metrics. The correlation magnitudes are compared to one another in order to identify correlated metrics. At least one of the correlated metrics is deleted from the set of metrics resulting in a subset of metrics that produce information representative of the full set of metrics. Deletion of metrics from the set of metrics may be optimized for accuracy by determining a subset of metrics that gives a minimum accuracy or the set of metrics may be optimized for cost by determining a subset of metrics that gives a best accuracy for a maximum number of metrics allowed. The representative subset of metrics can then be used to monitor the resource.

DESCRIPTION OF THE DRAWINGS

FIG. 2 shows an example time line over which metric data is collected to monitor a resource.

FIG. 3 shows a table of metrics collected in intervals of the time line shown in FIG. 2.

FIG. 4A shows correlations arranged in a correlation matrix.

FIG. 4B shows correlation magnitudes arranged in a correlation magnitude matrix.

FIGS. 9A-9E show results obtained from an implementation of the computational methods.

FIGS. 10A-10D show results obtained from an implementation of the computational methods.

DETAILED DESCRIPTION

This disclosure presents computational systems and methods for identifying a subset of a set of metrics that is representative of the information provided by the full set of metrics regarding resource performance. As used herein, a resource may be any physical or virtual component of a computer system that has limited availability and is able to be evaluated using one or more metrics. Examples of a resource include a server, a storage array, a network, and a sensor. A resource may also be any external device connected to a computer system or any internal component of the computer system. Resources also include virtual resources such as files, network connections and memory areas. A metric may be any system of measurement that produces a numerical value that represents a measurable aspect, feature, or component of a resource over time. For example, if a resource to be monitored is a server, an example set of metrics that can be collected to evaluate the server's performance over a period of time include percentage of buffer hits, buffer reads per second, processing time, and electrical power consumption.

It should be noted at the onset that data relating to a resource, such as metric data and correlation data are not, in any sense, abstract or intangible. Instead, the data is necessarily digitally encoded and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems on electronically or magnetically stored data, with the results of the data processing and data analysis digitally encoded and stored in one or more tangible, physical, data-storage devices and media.

Figure 1:
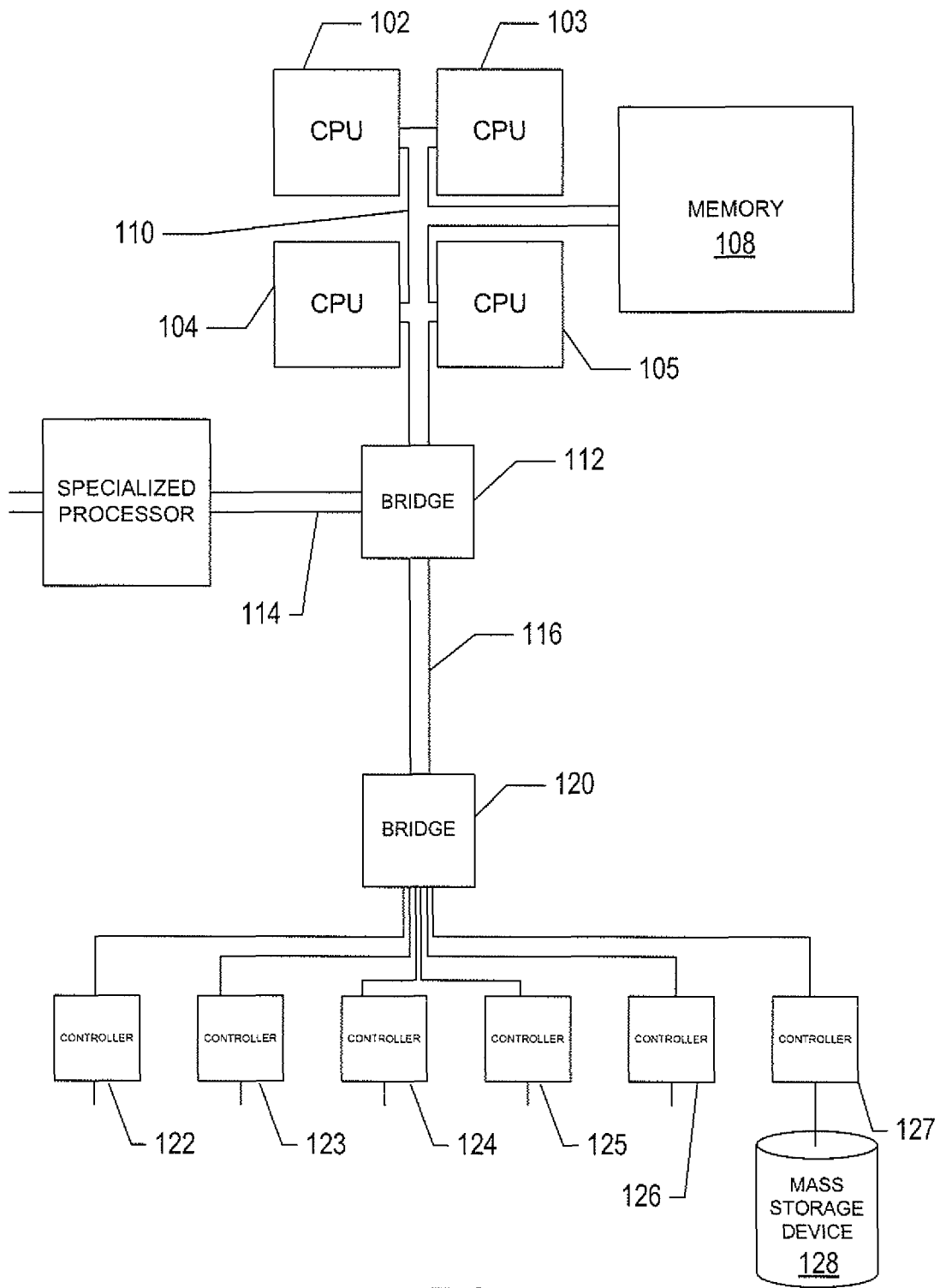
FIG. 1 shows an example of a generalized computer system that executes efficient methods for identifying a subset of a set of metrics.

FIG. 1 shows an example of a generalized computer system that executes efficient methods for identifying a subset of a set of metrics that is representative of the information provided by the entire set of metrics regarding resource performance and therefore represents a data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. The busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of computer-readable media, such as computer-readable medium 128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 128 is a data-storage device, including electronic memory, optical or magnetic disk drive, USB drive, flash memory and other such data-storage device. The computer-readable medium 128 can be used to store machine-readable instructions that encode the computational methods described below and can be used to store encoded data, during store operations, and from which encoded data can be retrieved, during read operations, by computer systems, data-storage systems, and peripheral devices.

FIG. 2 shows an example time line 202 that starts at time zero "0" over which metric data used to monitor a resource is collected. The time line 202 is broken into p time intervals 204-207, where p is a positive integer. Within each time interval, a set of n metrics labeled $m_1$ through $m_n$ in column 302 of FIG. 3 and denoted by $$\tilde{M} = \{m_i | i=1, \ldots, n\} \quad (1)$$

where n is a positive integer; and

"~" symbol indicates a set.

are used to monitor the resource. The set of metrics can be encoded and stored in a computer-readable medium. The selection of metrics may be determined by the type of resource being monitored. For example, when the resource is a server, $m_1$ can be the CPU usage, $m_2$ can be number of buffer accesses, $m_3$ can be electrical power consumption and so on. Metric values associated with each of the n metrics are calculated and stored in a computer-readable medium for each of the p time intervals in the time line 202. In the time interval 204 between time "0" and time $t_1$, n metrics values are calculated for the resource and stored in a computer-readable medium, and in the time interval 205 between time $t_1$ and time $t_2$, the same n metrics are again calculated for the resource and stored in the computer-readable medium. The values of metrics collected for each of the intervals of the time line 202 shown in FIG. 2 are listed in columns 304-307. The metric value of each metric encoded and stored in the computer-readable medium is denoted by $m_s(t)$, where the subscript s is an integer that represents a metric index that ranges from 1 to n, and t is an integer that represents a time interval index that ranges from 1 to p. For example, the metric value $m_1(1)$ 310 is the amount of time a CPU was used in the first time interval 204, and the metric value $m_2(2)$ 312 is the number of times a buffer was accessed in the second time interval 205. Note that the time intervals of the time line 202 may have different durations and do not have to begin when a preceding time interval ends. In other words, the time intervals over which the n metrics are calculated can be separated by time intervals in which the n metrics are not calculated. The time line 202 may be a sample time line used to obtain a sufficient number of metric values for each of the metrics in the set $\tilde{M}$ so that each metric can be statistically correlated with another metric in the set $\tilde{M}$ as described below. For example, the time line 202 may have hundreds, thousands, or millions of time intervals in which metric values are collected for each metric in the set $\tilde{M}$.

The values of the metrics may depend on the resource usage pattern over the time line. As a result, the metric values may be calculated and collected while running a mix of tests against the resource during the time line. For example, one test can include positive tests in which the demand on the resource is low as well as negative tests in which the demand on the resource is high. The test may also include stress tests. The test selected can be designed to cover cases in which the metrics have strong correlation under positive test conditions and have potentially weak correlation when the resource is under negative test conditions.

After the n metrics values have been collected for each of the p time interval, as represented by the set $\{m_1(t), m_2(t), \ldots, m_n(t) | t=1, \ldots, p\}$, the correlation magnitude is calculated for each pair of metrics in the set $\tilde{M}$:

$$c_{i,j} = |\text{corr}(m_i, m_j)| \quad (2)$$

where $m_i \in \tilde{M}$ and $m_j \in \tilde{M}$; and $\text{corr}(m_i, m_j)$ is the correlation between the metrics $m_i$ and $m_j$.

The correlation magnitude associated with each pair of metrics is encoded and stored in the computer-readable medium. In Equation (2), the correlation may be computed using:

$$\text{corr}(m_i, m_j) = \frac{E[(m_i - \mu_i)(m_j - \mu_j)]}{\sigma_i \sigma_j} \quad (3)$$

for the entire population of metrics in the set $\tilde{M}$. The numerator in Equation (3) is the expectation value given by:

$$E[(m_i - \mu_i)(m_j - \mu_j)] = \frac{1}{p} \sum_{t=1}^{p} (m_i(t) - \mu_i)(m_j(t) - \mu_j) \quad (4)$$

and the denominator of Equation (3) is a product of standard deviations of the pair of metrics $m_i$ and $m_j$, which can be computed according to:

$$\sigma_s = \sqrt{\frac{1}{p} \sum_{t=1}^{p} (m_s(t) - \mu_s)^2} \quad (5)$$

where s=i and j.

The expectation value in Equation (4) and standard deviation in Equation (5) are functions of the average value of each of the metrics $m_i$ and $m_j$:

$$\mu_s = \frac{1}{p} \sum_{t=1}^{p} m_s(t) \quad (6)$$

The value resulting from the correlation corr($m_i$, $m_j$) calculated according to Equation (3) lies in the interval [−1,1] and indicates the non-linearity and direction of a linear relationship between the metrics $m_i$ and $m_1$. The closer corr($m_i$, $m_j$) is to "0," the lower the correlation between the pair of metrics $m_i$ and $m_j$ with corr($m_i$, $m_j$)=0, indicating that the metrics $m_i$ and $m_j$ are not correlated. The closer corr($m_i$, $m_j$) is to "−1" or "1," the higher the correlation between the pair of metrics $m_i$ and $m_j$ with corr($m_i$, $m_j$)=−1 or 1, indicating the metrics $m_i$ and $m_j$ are highly correlated. The sign associated with the correlation corr($m_i$, $m_j$) indicates whether the data has a positively sloped or negatively sloped relationship. For example, if linear regression is applied to the set of metric value pairs $\{(m_i(t),m_j(t))|t=1,\ldots,p\}$, a positive correlation would correspond to a positively sloped regression line and a negative correlation would correspond to a negatively sloped regression line. Alternatively, the correlation magnitude $c_{i,j}$ calculated according to Equation (2) lies in the interval [0,1] and provides the correlation but not the positive or negative slope relationship of the metrics $m_i$ and $m_j$. In particular, the closer $c_{i,j}$ is to "0," the lower the correlation between the pair of metrics $m_i$ and $m_j$ with $c_{i,j}$=0, indicating that the metrics $m_i$ and $m_j$ are not correlated. The closer $c_{i,j}$ is to "1," the higher the correlation between the pair of metrics in and $m_i$ with $m_j$ with $c_{i,j}$=1, indicating the metrics $m_i$ and $m_j$ are highly correlated.

Alternatively, rather than calculating the correlations and/or correlation magnitudes for the entire population of p time intervals in a time line, as described above with reference to Equations (2)-(7), sample correlations and/or sample correlation magnitudes may be calculated and stored in the computer-readable medium. For example, a sample correlation for each pair of metrics can be calculated using the sample correlation $$corr_{sample}(m_i, m_j) = \frac{\sum_{r}^{q}(m_i(r) - \overline{m}_i)(m_j(r) - \overline{m}_j)}{\sqrt{\sum_{r}^{q}(m_i(r) - \overline{m}_i)}\sqrt{\sum_{r}^{q}(m_j(r) - \overline{m}_j)}} \qquad (7)$$

where q is the number of samples with q≤p;
r is an integer time interval index selected from the range 1 to p; and $$\overline{m}_s = \frac{1}{q}\sum_{r}^{q} m_s(r)$$

with s=i and j.
The sample correlation magnitude is given by $$c_{i,j}^{sample} = |corr_{sample}(m_i, m_j)| \qquad (8)$$

FIG. 4A shows correlations arranged in a correlation matrix 400 with the correlations corr($m_i$, $m_j$) as matrix elements. The correlation matrix 400 is symmetric (i.e., corr($m_i$, $m_j$)=corr($m_j$,i) for all i and j). According to Equations (3), (4), and (5) above, the main diagonal elements, corr($m_i$, $m_i$), are all equal to "1," because $$corr(m_i, m_i) = \frac{\frac{1}{p}\sum_{t=1}^{p}(m_i(t) - \mu_i)(m_i(t) - \mu_i)}{\sqrt{\frac{1}{p}\sum_{t=1}^{p}(m_i(t) - \mu_i)^2}\sqrt{\frac{1}{p}\sum_{t=1}^{p}(m_i(t) - \mu_i)^2}}$$

-continued $$= \frac{\frac{1}{p}\sum_{t=1}^{p}(m_i(t) - \mu_i)^2}{\frac{1}{p}\sum_{t=1}^{p}(m_i(t) - \mu_i)^2}$$

$$= 1$$

In other words, every metric is highly correlated with itself. Because the correlations form a symmetric matrix and the diagonal elements equal to "1," the correlations corr($m_i$, $m_j$) are only calculated for i=1, ..., n and j=i+1, ..., n, which corresponds to the off-diagonal upper-triangular portion, lower-triangular portion, of the correlation matrix 400.

FIG. 4B shows correlation magnitudes arranged in a matrix 410. The correlation magnitude matrix 410 is a symmetric matrix (i.e., $c_{i,j}$=$c_{j,i}$ for all i and j) with the main diagonal elements equal to "1" (i.e., $c_{i,i}$=1). Because the correlation magnitudes form a symmetric matrix, only the off-diagonal upper-triangular elements, or off-diagonal lower-triangular elements, are used to form a set of correlations magnitudes:

$$\tilde{C} = \{c_{i,j}|i,j=1,\ldots,n;j=i+1,\ldots,n\} \qquad (9)$$

that are calculated and stored in a computer-readable medium. The diagonal matrix elements are not included in $\tilde{C}$ because each diagonal matrix element represents the correlation magnitude of a metric with itself, which is irrelevant when eliminating matrix elements that are correlated with other matrix elements in the set $\tilde{M}$.

It should be noted that correlations and correlation magnitudes associated with certain metrics may be undefined and identified as not a number ("NaN"). Undefined correlation result from metrics that are constant throughout the time intervals of the time line. For example, when a metric $m_s(t)$=constant for all t=1, ..., p, according to Equation (6) $\mu_s$=constant, which gives a standard deviation $\sigma_s$=0 according to Equation (5). As a result, the correlation and correlation magnitude of $m_s(t)$ paired with any other metric in $\tilde{M}$ is undefined.

The set of metrics $\tilde{M}$ in Equation (1) and a set of correlation magnitudes $\tilde{C}$ in Equation (9) are mathematical related such that each pair of elements in $\tilde{M}$, ($m_i$, $m_j$), are related to one of the elements $c_{i,j}$ of $\tilde{C}$. The mathematical relationship may be represented by a graph that consists of the two sets $\tilde{M}$ and $\tilde{C}$ denoted by ($\tilde{M}$, $\tilde{C}$). The elements of $\tilde{M}$ may be called vertices or nodes, and the elements of $\tilde{C}$ may be called edges that connect two vertices (i.e., pair of metrics). A subset $\tilde{M}'$ of the set $\tilde{M}$ is representative of the information provided by the entire set of metrics in $\tilde{M}$ may be obtained by identifying a number of metrics with the highest correlation to other metrics in the set $\tilde{M}$ and eliminating those metrics from the set $\tilde{M}$ to give the representative subset $\tilde{M}'$.

FIGS. 5A-5D show a series of graphs that present an example of determining a subset of metrics of a larger set of metrics, where the subset is representative of the information provided by the original set. Consider an original example set of metrics given by:

$$\tilde{M}_{ex} = \{m_i|=1,\ldots,8\}$$

and corresponding set of correlation magnitudes given by:

$$\tilde{C}_{ex} = \{c_{i,j}|i=1,\ldots,8;j=i+1,\ldots,8\}$$

Figure 5A:
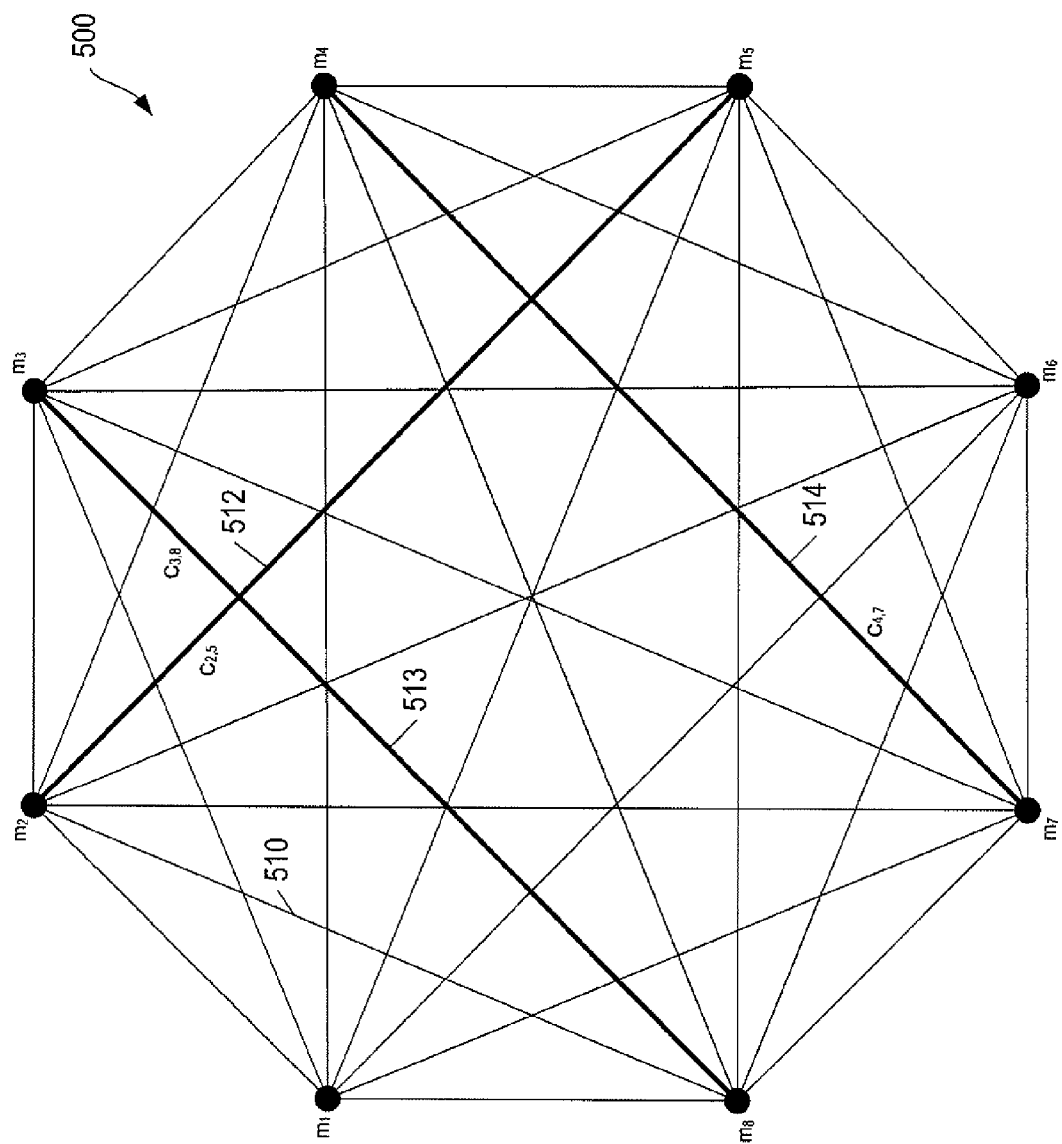
FIGS. 5A-5D show graphs as an example of determining a representative subset of a larger set of metrics.

FIG. 5A shows a graph ($\tilde{M}_{ex}$,$\tilde{C}_{ex}$) 500. Solid dots denoted by $m_1$, $m_2$, $m_3$, $m_4$, $m_5$, $m_6$, $m_7$, and $m_8$ are vertices that represent the metrics in the set $\tilde{M}_{ex}$ and lines connecting two vertices, such as line 510, are edges that represent the correlation magnitude $c_{i,j}$ between two metrics located at opposite ends of the edge. Note that for the sake simplicity and to avoid confusion not all of the edges in FIGS. 5A-5D are labeled with the corresponding correlation magnitude. But the correlation magnitude can be readily observed by examining the metrics at the two vertices of an edge. For example, edge 510 connects vertices $m_2$ and $m_8$ which means the correlation magnitude associated with the edge 510 is $c_{2,8}$ even though the edge 510 is not labeled $c_{2,8}$ in FIGS. 5A-5D. In the example of FIGS. 5A-5D, it is assumed that darkened edges 512-514 represent the three largest correlation magnitudes with $c_{2,5} > c_{3,8} > c_{4,7}$ in the set $\tilde{C}_{ex}$. After the largest correlation magnitude $c_{2,5}$ has been identified, the correlation magnitudes associated with the metrics $m_2$ and $m_5$ are examined to determine which of these two metrics has the larger correlation magnitude associated with the other metrics in the set $\tilde{M}_{ex}$. For the metric $m_2$, the subset of correlation magnitudes of $\tilde{C}_{ex}$ in which the metric $m_2$ is one of the pair of metrics is $$\{c_{1,2}, c_{2,3}, c_{2,4}, c_{2,5}, c_{2,6}, c_{2,7}, c_{2,8}\}$$

For the metric $m_5$, the subset of correlation magnitudes of $\tilde{C}_{ex}$ in which the metric $m_5$ is one of the pair of metrics is $$\{c_{1,5}, c_{2,5}, c_{3,5}, c_{4,5}, c_{5,6}, c_{5,7}, c_{5,8}\}$$

The correlation magnitudes associated with the metrics $m_2$ and $m_5$ can be determined by summing the correlation magnitudes associated with the metrics $m_2$ and $m_5$ as follows:

$$\mathrm{sum}_2 = c_{1,2} + c_{2,3} + c_{2,4} + c_{2,5} + c_{2,6} + c_{2,7} + c_{2,8}$$

$$\mathrm{sum}_5 = c_{1,5} + c_{2,5} + c_{3,5} + c_{4,5} + c_{5,6} + c_{5,7} + c_{5,8}$$

Figure 5B:
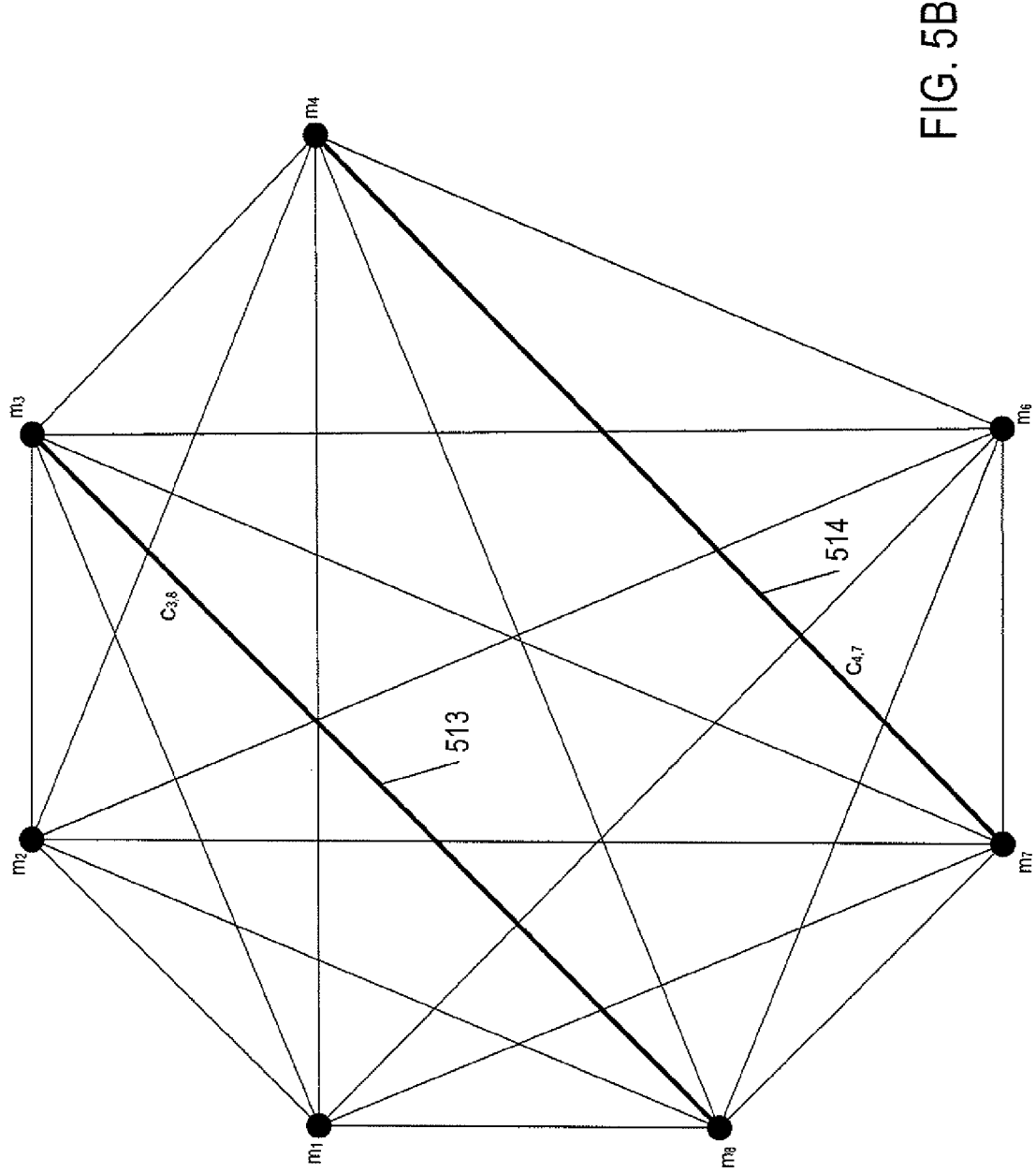

Assuming, for example, that $\mathrm{sum}_5 > \mathrm{sum}_2$, the metric $m_5$ is deleted from the set $\tilde{M}_{ex}$ (i.e., $\tilde{M}_{ex} = \tilde{M}_{ex} - m_5$) and the associated correlation magnitudes are deleted from the set $\tilde{C}_{ex}$ to give the graph represented in FIG. 5B. The largest correlation magnitude remaining is $c_{3,8}$ and the correlation magnitudes associated with the metrics $m_3$ and $m_8$ are examined to determine which of these two metrics has the larger correlation magnitude associated with the other metrics in the set $\tilde{M}_{ex}$. For the metric $m_3$, the subset of correlation magnitudes left in $\tilde{C}_{ex}$ in which the metric $m_3$ is one of the pair of metrics is $$\{c_{1,3}, c_{2,3}, c_{3,4}, c_{3,6}, c_{3,7}, c_{3,8}\}$$

For the metric $m_8$, the subset of correlation magnitudes of $\tilde{C}_{ex}$ in which the metric $m_8$ is one of the pair of metrics is $$\{c_{1,8}, c_{2,8}, c_{3,8}, c_{4,8}, c_{6,8}, c_{7,8}\}$$

Summing correlation magnitudes associated with the metrics $m_3$ and $m_8$ gives:

$$\mathrm{sum}_3 = c_{1,3} + c_{2,3} + c_{3,4} + c_{3,6} + c_{3,7} + c_{3,8}$$

$$\mathrm{sum}_8 = c_{1,8} + c_{2,8} + c_{3,8} + c_{4,8} + c_{5,8} + c_{7,8}$$

Figure 5C:
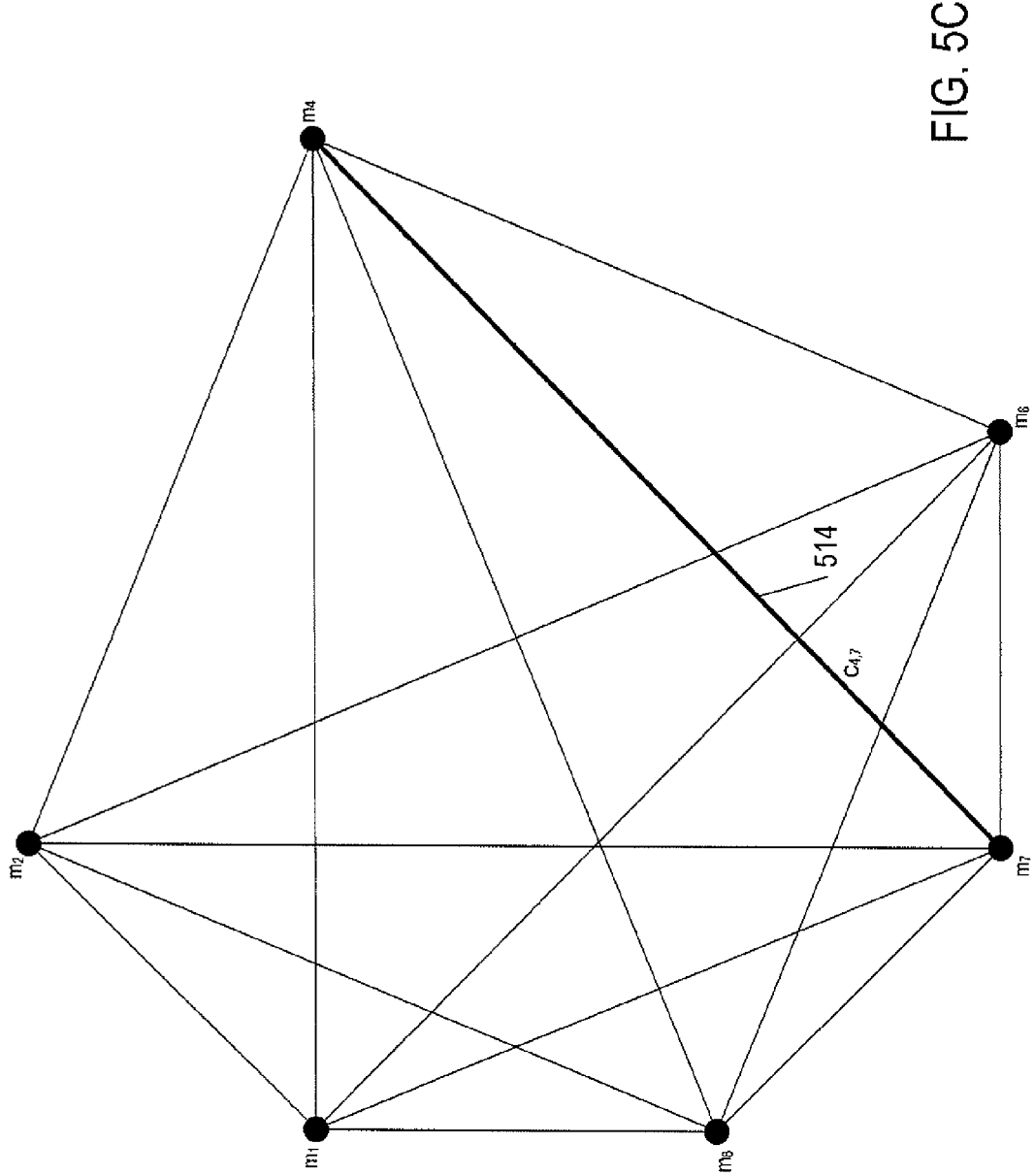

Assuming, for example, that $\mathrm{sum}_3 > \mathrm{sum}_8$, the metric $m_3$ is deleted from the set $\tilde{M}_{ex}$ (i.e., $\tilde{M}_{ex} = \tilde{M}_{ex} - m_3$) and the associated correlation magnitudes are deleted from the remaining set of correlation magnitudes to give the graph represented in FIG. 5C. The largest correlation magnitude remaining is $c_{4,7}$ and the correlation magnitudes associated with the metrics $m_4$ and $m_7$ are examined to determine which of these two metrics has the larger correlation magnitude associated with the other metrics in the set $\tilde{M}_{ex}$. For the metric $m_4$, the subset of correlation magnitudes left in $\tilde{C}_{ex}$ in which the metric $m_4$ is one of the pair of metrics is $$\{c_{1,4}, c_{2,4}, c_{4,6}, c_{4,7}, c_{4,8}\}$$

For the metric $m_7$, the subset of correlation magnitudes of $\tilde{C}_{ex}$ in which the metric $m_7$ is one of the pair of metrics is $$\{c_{1,7}, c_{2,7}, c_{4,7}, c_{6,7}, c_{7,8}\}$$

Summing correlation magnitudes associated with the metrics $m_4$ and $m_7$ gives:

$$\mathrm{sum}_4 = c_{1,4} + c_{2,4} + c_{4,6} + c_{4,7} + c_{4,8}$$

$$\mathrm{sum}_7 = c_{1,7} + c_{2,7} + c_{4,7} + c_{6,7} + c_{7,8}$$

Figure 5D:
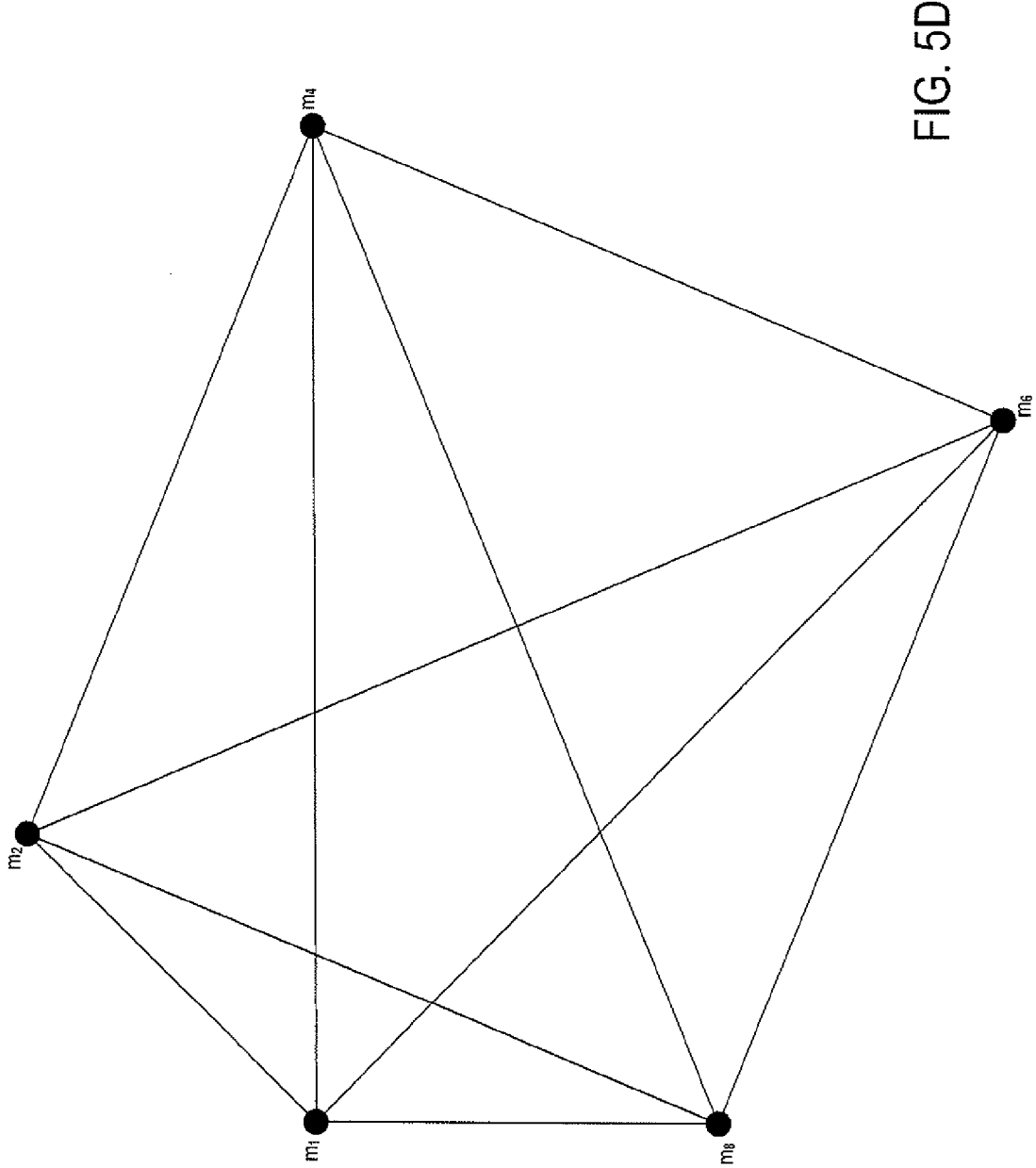

Assuming, for example, that $\mathrm{sum}_7 > \mathrm{sum}_4$, the metric $m_7$ is deleted from the set $\tilde{M}_{ex}$ (i.e., $\tilde{M}_{ex} = \tilde{M}_{ex} - m_7$) and the associated correlation magnitudes are deleted from the remaining set of correlation magnitudes to give the graph represented in FIG. 5D. In the example of FIG. 5, the number of metrics deleted from the set $\tilde{M}_{ex}$ is three, leaving an example representative subset:

$$\tilde{M}_{ex}' = \{m_1, m_2, m_4, m_6, m_8\}$$

By deleting the highest correlated metrics from the set $\tilde{M}$, the representative subset $\tilde{M}'$ is largely composed of lesser correlated metrics and/or metrics that may not be correlated at all. Using the representative subset $\tilde{M}'$ to assess the performance of a resource instead of using all of the metric in the set $\tilde{M}$ avoids computing metrics that would otherwise give potentially redundant information. For example, in the example described above with reference to FIGS. 5A-5D, initially the metrics $m_2$ and $m_5$ have the highest correlation magnitude when evaluating the performance of a resource, which indicates that the information represented by the metric $m_2$ is already represented by the metric $m_5$. As a result, computing both $m_2$ and $m_5$ to assess the performance of the resource would provide essentially redundant information. By deleting the metric $m_5$ from the set $\tilde{M}$ based on $m_5$ having the highest correlation magnitude with the other metrics in the set $\tilde{M}$ when compared to $m_2$, the metric $m_2$ is considered in assessing the performance of a resource without having to waste time and memory calculating and storing the metric $m_5$.

The size of the representative subset $\tilde{M}'$ may be determined by (1) optimizing for cost or (2) by optimizing for accuracy. When optimizing for cost, a user may select a maximum number, $N_{max}$, of metrics allowed in the representative subset $\tilde{M}'$. Alternatively, when optimizing for accuracy, a user may select a minimum accuracy, $\mathrm{acc}_{min}$, for the representative subset $\tilde{M}'$. Beginning with the highest correlated metric from the set $\tilde{M}$, metrics are iteratively deleted from the set $\tilde{M}$ until the minimum accuracy is reached. The accuracy may be calculated at each iteration using:

$$acc_{r+1} = acc_r - \frac{(1 - \max\_c_{i,j})}{n'} \quad (10)$$

where r is a positive integer index with $acc_1 = 1$;

$\max\_c_{i,j}$ represents a current maximum correlation magnitude in the set $\tilde{C}$; and $n'$ is the current number of elements in the set $\tilde{M}$.

As long as $\mathrm{acc} \geq \mathrm{acc}_{min}$, either $m_i$ or $m_j$ is deleted from the set $\tilde{M}$ based on which of these metrics has the highest overall correlation magnitude with the other metrics remaining in the set $\tilde{M}$, as described above with reference to FIG. 5. When either $m_i$ or $m_j$ is deleted from the set $\tilde{M}$, $n'$ is decremented.

Figure 6:
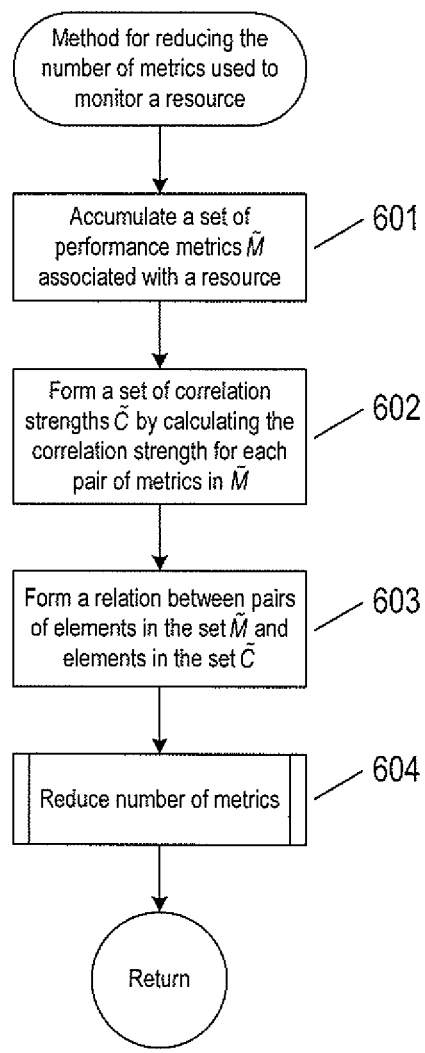
FIG. 6 shows a flow diagram of a method for reducing the number of metrics used to monitor a resource.

FIG. 6 shows a flow diagram of a method for reducing the number of metrics used to monitor a resource. In block 601, a set of metrics $\tilde{M}$ associated with a resource may be received or the metrics may be calculated from measurements performed on the resource over a time line and stored in a computer-readable medium, as described above with reference to FIGS. 2 and 3. In block 602, for each pair of metrics in the set $\tilde{M}$, a correlation magnitude is calculated according to Equations (2)-(8) and stored in the computer-readable medium to form a set of correlation magnitudes $\tilde{C}$, as described above with reference to Equation (9). In block 603, a mathematical relation that relates each pair of metrics to their corresponding correlation magnitude in the set $\tilde{C}$ is formed. For example, the set of metrics and set of correlations magnitudes can be related mathematically by a graph. In block 604, a routine "reduce number of metrics" is called to obtain a representative subset of the set $\tilde{M}$. The routine "reduce number of metrics" can be implemented as described below with reference to the flow-control diagram of FIG. 7 or as described below with reference to the flow-control diagram of FIG. 8.

Figure 7:
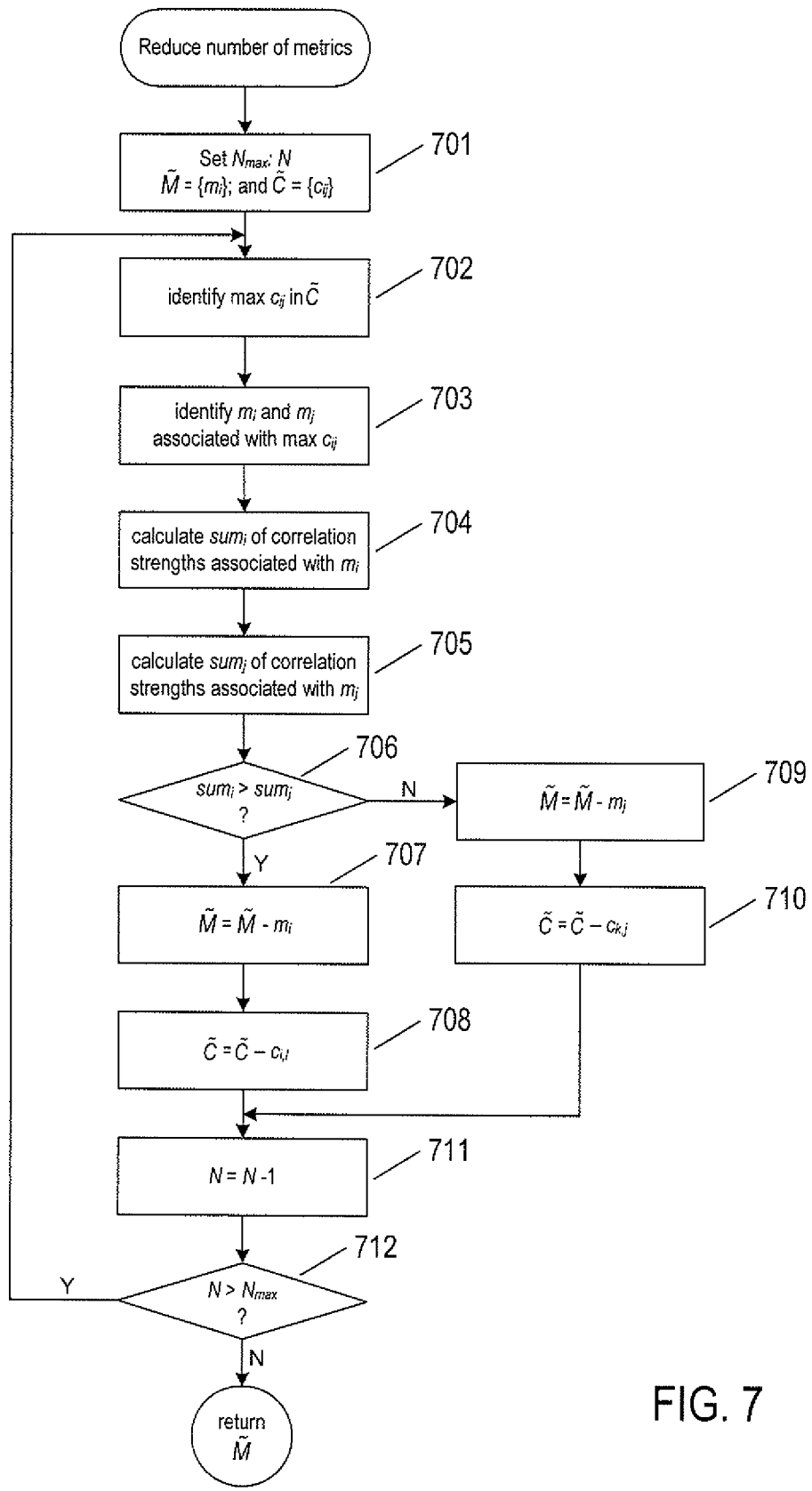
FIG. 7 shows an example of a flow-control diagram for the routine "reduce number of metrics" called in block 604 of the flow diagram of FIG. 6.

FIG. 7 shows an example of a flow-control diagram for the routine "reduce number of metrics" called in block 604 of the flow diagram of FIG. 6. This flow control diagram implements cost optimization based on a user defined maximum number of metrics allowed in a representative subset of the metrics. In block 701, the set of metrics $\tilde{M}$ and set of correlation magnitudes $\tilde{C}$ are received and a user selects a maximum number of elements, $N_{max}$, for the representative subset of $\tilde{M}$. The number of elements in the original set of metrics $\tilde{M}$ is N. In block 702, a maximum correlation magnitude $c_{i,j}$ in the set $\tilde{C}$ is identified. In block 703, the pair of metrics $m_i$ and $m_j$ associated with the maximum correlation magnitude $c_{i,j}$ are identified. In block 704, correlation magnitudes that correspond to $m_i$ correlated with other metrics in the set $\tilde{M}$ are identified and summed to give $$sum_i = \sum_l c_{i,l} \qquad (11a)$$

where l is the index of metrics in $\tilde{M}$ that have correlation magnitudes $c_{i,l}$ in $\tilde{C}$.
In block 705, correlation magnitudes that correspond to $m_j$ correlated with other metrics in the set $\tilde{M}$ are identified and summed to give $$sum_j = \sum_k c_{k,j} \qquad (11b)$$

where k is the index of metrics in $\tilde{M}$ that have correlation magnitudes $c_{k,j}$ in $\tilde{C}$.
When $sum_i$ is greater than $sum_j$ in block 706, control flows to block 707, otherwise, control flows to block 709. In block 707, the metric $m_i$ is deleted from the set $\tilde{M}$:

$$\tilde{M}=\tilde{M}-m_i$$

and for each l, the correlation magnitudes $c_{i,l}$ may be deleted from the set $\tilde{C}$ in block 708. In block 709, the metric $m_j$ is deleted from the set $\tilde{M}$:

$$\tilde{M}=\tilde{M}-m_j$$

and for each k, the correlation magnitudes $c_{k,j}$ may be deleted from the set $\tilde{C}$ in block 710. In block 711, the number N is decremented to match the number of metrics remaining in the set $\tilde{M}$. As long as the number N of metrics remaining in the set $\tilde{M}$ is greater than the user defined $N_{max}$, in block 712, the operations in blocks 702-711 are repeated. Otherwise, the remaining set of metrics is returned and is composed of metrics that are representative of the information in the original set of metrics.

Figure 8:
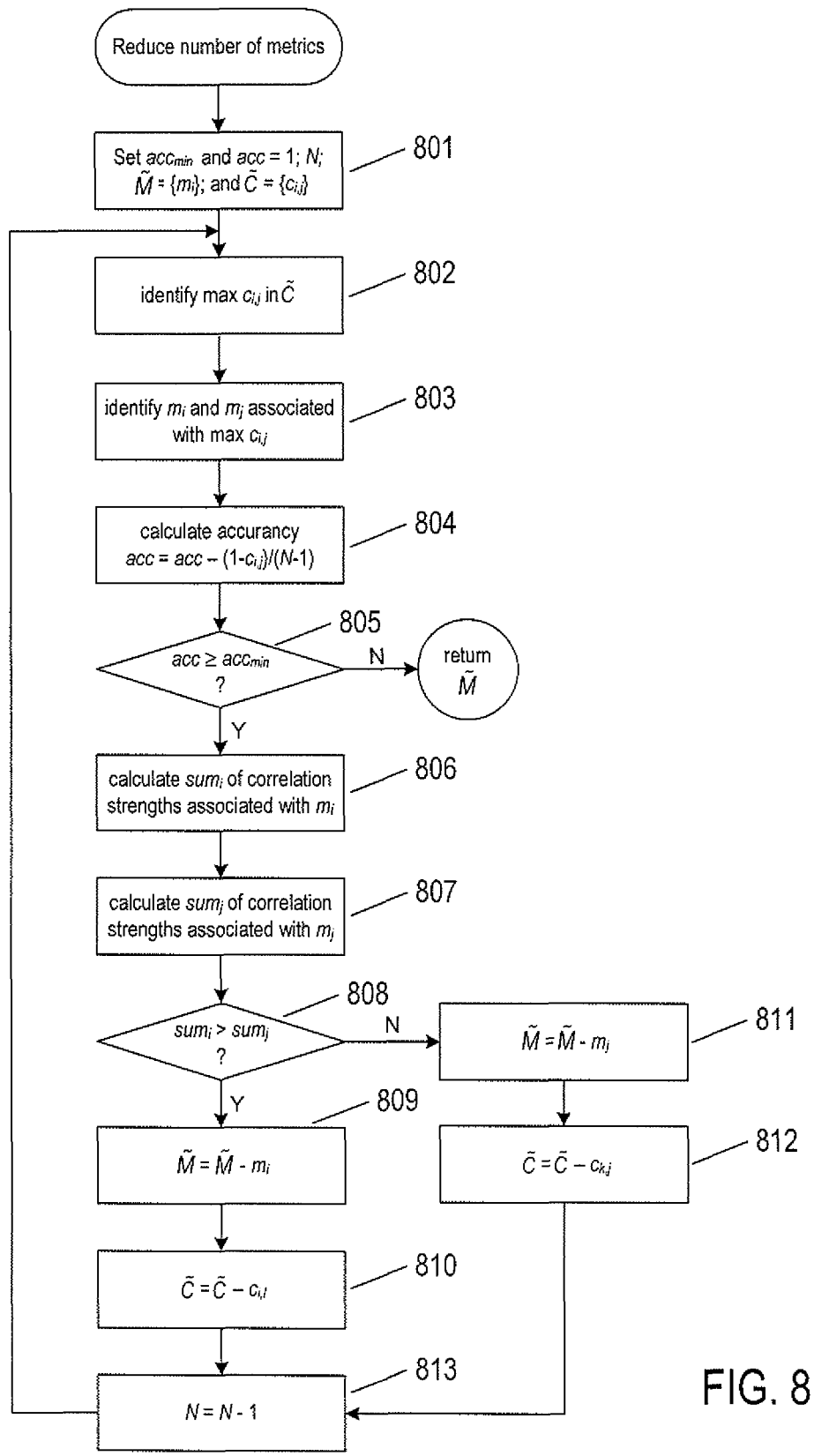
FIG. 8 shows an example of a flow-control diagram for the routine "reduce number of metrics" called in block 604 of the flow diagram of FIG. 6.

FIG. 8 shows an example of a flow-control diagram for the routine "reduce number of metrics" called in block 604 of the flow diagram of FIG. 6. This flow control diagram implements accuracy optimization based on a user defined minimum accuracy described above with reference to Equation (10) as an alternative to the method for cost optimization described above with reference to FIG. 7. In block 801, the set of metrics $\tilde{M}$ and set of correlation magnitudes $\tilde{C}$ are received and a user selects a minimum accuracy $acc_{min}$ for the representative subset of $\tilde{M}$, and the accuracy value acc is initialized to "1." The number of elements in the original set of metrics $\tilde{M}$ is N. Blocks 802 and 803 execute the same operations, respectively, as the blocks 702 and 703 described above. In block 804, the accuracy is calculated according to Equation (10), assuming max $c_{i,j}$ has been deleted from the set $\tilde{C}$. As long as the accuracy acc is greater than or equal to the user defined minimum accuracy $acc_{min}$, the operations in blocks 806-813 are executed. Blocks 806-813 execute the same operations, respectively, as the blocks 704-711 described above. Otherwise, the remaining set of metrics is returned and is composed of metrics that are representative of the information in the original set of metrics.

EXAMPLES

Figure 9C:
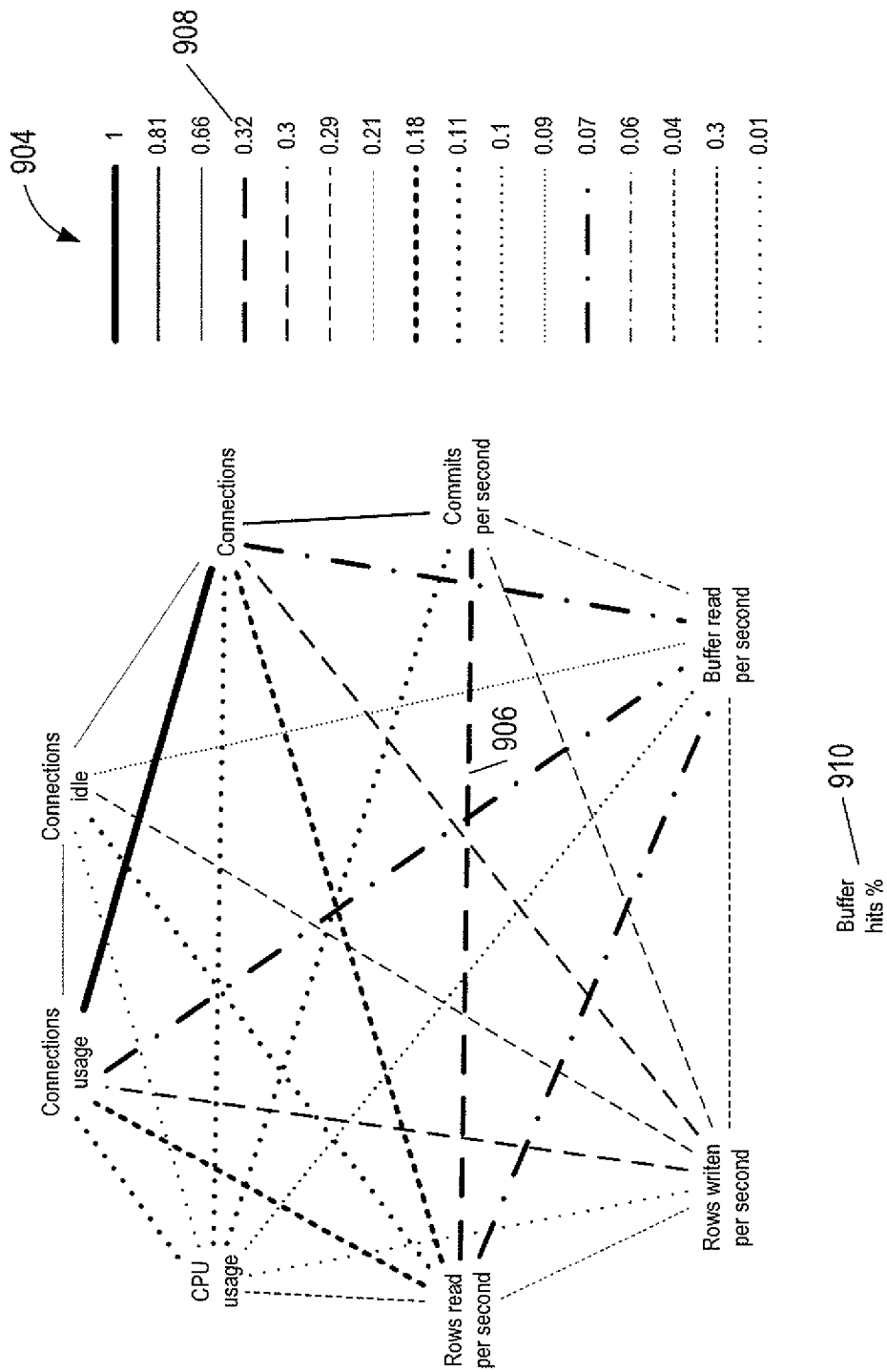
Figure 9D:
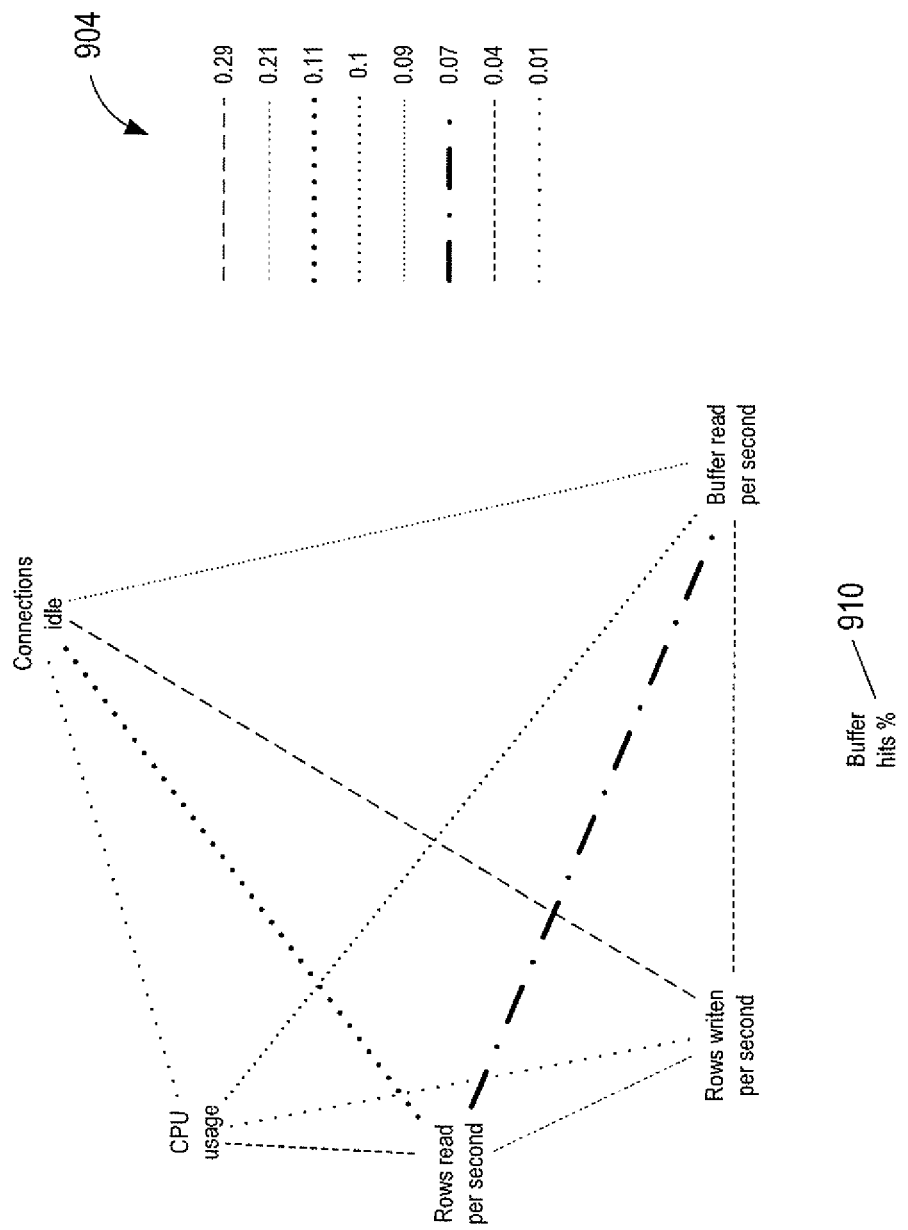
Figure 9E:
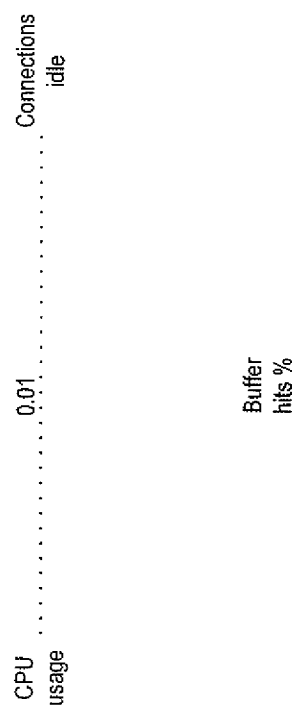

FIGS. 9A-9E show results obtained from an implementation of the computational methods described above. FIG. 9A shows a Table 900 of nine metrics and associated metric values obtained from monitoring a vPostgres database server over a two hour period of time. The metrics collected were "buffer hits %," "buffer reads per second," "commits per second," "connections," "connections idle," "connections usage," "CPU usage," "rows read per second," and "rows written per second." In Table 900, the metrics are listed horizontally and a representative set of metric values associated with each metric are listed below each metric in the second row of Table 900. The metric values obtained over a period of two hours are not shown but are instead represented by a series of three dots 902. FIG. 9B shows a correlation matrix calculated from the metric values represented in Table 900 as described above with reference to Equations (2)-(8). Note that the diagonal elements are "1" and correlations for "buffer hits %" with the other metrics are undefined and identified as NaN, because the "buffer hits %" had a constant metric value of 0.99972 over the two hour time period. FIG. 9C shows a correlation graph with the metrics listed in Table 900 appearing as vertices connected by differently patterned edges. Each edge line pattern corresponds to a different correlation magnitude listed in table 904. For example, the correlation magnitude between the vertices "rows read per second" and "commits per second" represented by edge 906 is 0.32908. Note also that the vertex "buffer hits %" 910 is not connected to any of the other vertices because the correlation magnitudes are undefined as represented in Table 900. FIG. 9D shows a correlation graph of the metrics remaining after three iterations of the method described above. This graph reveals that the highest correlated metrics "connections usage," "connections," and "commits per second," and their corresponding correlation magnitudes was deleted from the graph. Three more iterations of the method described above reveals the three lowest correlated metrics in the correlation graph of FIG. 9E. The "CPU usage," "connections idle," and "buffer hits %" are representative of the original nine metrics.

Figure 10A:
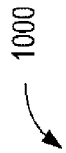
Figure 10C:
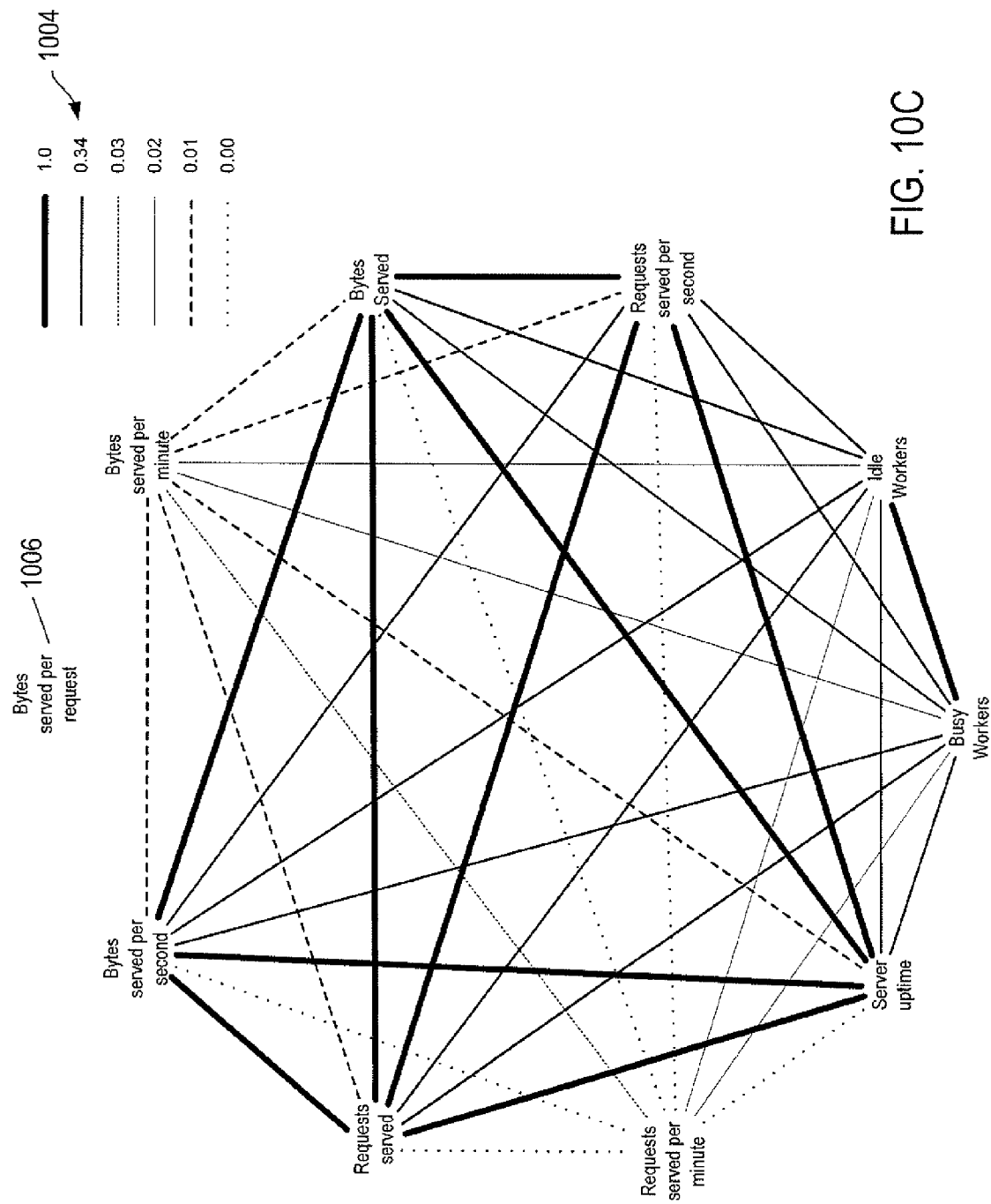
Figure 10D:
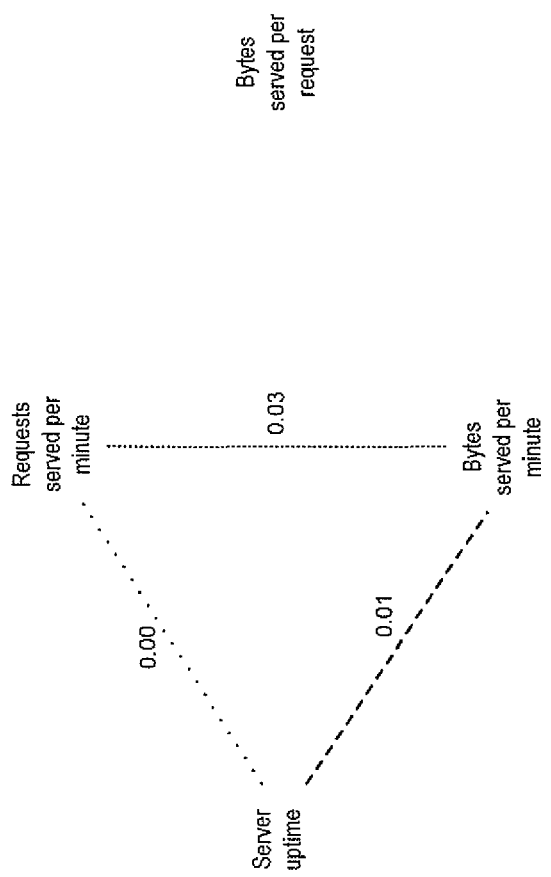

FIGS. 10A-10D show results obtained from an implementation of the computational methods described above. FIG. 10A shows a Table 1000 of ten metrics and a listing of associated metrics values obtained from monitoring a vFabric Web Server over a two hour period of time. The metrics collected were "busy workers," "idle workers," "requests served per second," "bytes served," "bytes served per minute," "bytes served per request," "requests served," "request served per minute," and "server uptime" listed along the top row of the Table 1000. In Table 1000, columns of metric values associated with each metric are listed below each metric. In this implementation, a number of the columns in Table 1000 had fewer entries than other columns. This was addressed by discarding entries from a number of the columns until all of the columns had the same number of entries. FIG. 10B shows a correlation matrix calculated from the metric values represented in Table 1000, as described above with reference to Equations (2)-(8). The diagonal elements are "1" and correlations for "bytes served per second" are undefined (i.e., "NaN"), because the "bytes served per second" has a constant metric value of 5,025 over the two hour time period. FIG. 10C shows a correlation graph with the metrics listed in Table 1000 appearing as vertices connected by differently patterned edges. Each edge pattern represents a different correlation magnitude listed in table 1004. It should be noted that the vertex "bytes served per request" 1006 is not connected to any of the vertices because the correlation magnitudes are undefined as represented in Table 1000. FIG. 10D shows a correlation graph of the metrics remaining after six iterations of applying the method described above. This graph reveals the four metrics with the lowest correlation magnitudes, which are representative of the original ten metrics.

Embodiments described above are not intended to be limited to the descriptions above. For example, any number of different computational-processing-method implementations that carry out for identifying a subset of larger set of metrics used to evaluate the performance of a resource may be designed and developed using various different programming languages and computer platforms and by varying different implementation parameters, including control structures, variables, data structures, modular organization, and other such parameters. The systems and methods are not limited to using $sum_i$ and $sum_j$ described above in Equations (11a) and (11b). Alternatively, Equations (11a) can be replaced by an average:

$$ave_i = \frac{1}{L} \sum_l c_{i,l} \quad (12a)$$

where l is the index of metrics in $\tilde{M}$ that have correlation magnitudes $c_{i,l}$ in $\tilde{C}$; and
L is the current number metrics with correlation magnitudes $c_{i,l}$.
And Equation (11b) can be replaced by an average:

$$ave_j = \frac{1}{K} \sum_k c_{k,j} \quad (12b)$$

where k is the index of metrics in $\tilde{M}$ that have correlation magnitudes $c_{k,j}$ in $\tilde{C}$; and
K is the current number metrics with correlation magnitudes $c_{k,j}$.
Alternatively, rather than reducing a set of metrics based on correlation magnitudes, correlations alone can be used to reduce the set of metrics.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A data-processing system comprising:
   one or more processors;
   one or more computer-readable media; and
   a routine stored in the computer-readable media that when executed on the one or more processors,
      receive a set of metrics from a resource, each metric represents a measurable component of the resource;
      calculates a set of correlation magnitudes, each correlation magnitude calculated for a pair of metrics in the set of metrics stored in the one or more computer-readable media;
      identifies a largest correlation magnitude in the set of correlation magnitudes stored in the one or more computer-readable media;
      identifies a first metric and a second metric associated with the largest correlation magnitude;
      deletes one of the first and second metric from the set of metrics based on which of the first and second metrics has larger correlation magnitudes with other metrics in the set of metrics; and
      deletes the correlation magnitudes associated with which of the first and second metrics has the largest correlation magnitudes from the set of correlation magnitudes.

2. The system of claim 1 wherein deletes the first or second metric from the set of metrics further comprises
   calculates a first sum of correlation magnitudes associated with the first metric;
   calculates a second sum of correlation magnitudes associated with the second metric;
   when the first sum is larger than the second sum, deletes the first metric from the set of metrics; and
   when the second sum is larger than the first sum, deletes the second metric from the set of metrics.

3. The system of claim 1 wherein deletes the first or second metric from the set of metrics further comprises
   calculates a first average of correlation magnitudes associated with the first metric;
   calculates a second average of correlation magnitudes associated with the second metric;
   when the first average is larger than the second average, deletes the first metric from the set of metrics; and
   when the second average is larger than the first average, deletes the second metric from the set of metrics.

4. The system of claim 1 further comprises:
   receives metric data values associated with a resource, each metric data value corresponds to a metric in a set of metrics stored in the computer-readable medium;
   calculates the set of correlation magnitudes, each correlation magnitude associated with a pair of metrics in the set of metrics; and
   stores the correlation magnitudes in the one or more computer-readable media.

5. The system of claim 4 wherein calculates the set of correlation magnitudes, each correlation magnitude associated with a pair of metrics in the set of metrics farther comprises:

for each pair of metrics in the set of metrics,
  calculates a correlation between a pair metrics based on the metric values associated with the pair of metrics;
  calculates an absolute value of each correlation to give a correlation magnitude associated with the pair of metrics; and
  stores a relation in the computer-readable medium that identifies the pair of metrics associated with the correlation magnitude.

6. The system of claim 1 further comprises repeating identifies the largest correlation magnitude, deletes the first or second metric from the set of metrics, and deletes the correlation magnitudes associated with which of the first or second metrics has the largest correlation magnitudes until the set of metrics is composed of a user-defined number of metrics.

7. The system of claim 1 further comprises repeating identifies the largest correlation magnitude, deletes the first or second metric from the set of metrics, and deletes the correlation magnitudes associated with which of the first or second metrics has the largest correlation magnitudes until the set of metrics reaches a user-defined minimum accuracy.

8. A method carried out within a computer system having one or more processors and an electronic memory that analyzes digitally encoded data stored in one or more computer-readable media, the method comprising:
  receiving a set of metrics from a resource, each metric represents a measurable component of the resource;
  calculating a set of correlation magnitudes, each correlation magnitude calculated for a pair of metrics in the set of metrics stored in the one or more computer-readable media;
  identifying a largest correlation magnitude in the set of correlation magnitudes stored in the one or more computer-readable media;
  identifying a first metric and a second metric associated with the largest correlation magnitude;
  deleting one of the first and second metric from the set of metrics, based on which of the first and second metrics has larger correlation magnitudes with other metrics in the set of metrics; and
  deleting the correlation magnitudes associated with which of the first or second metrics has the largest correlation magnitudes from the set of correlation magnitudes.

9. The method of claim 8 wherein deleting the first or second metric from the set of metrics further comprises
  calculating a first sum of correlation magnitudes associated with the first metric;
  calculating a second sum of correlation magnitudes associated with the second metric;
  when the first sum is larger than the second sum, deleting the first metric from the set of metrics; and
  when the second sum is larger than the first sum, deleting the second metric from the set of metrics.

10. The method of claim 8 wherein deleting the first or second metric from the set of metrics further comprises
  calculating a first average of correlation magnitudes associated with the first metric;
  calculating a second average of correlation magnitudes associated with the second metric;
  when the first average is larger than the second average, deleting the first metric from the set of metrics; and
  when the second average is larger than the first average, deleting the second metric from the set of metrics.

11. The method of claim 8 further comprises:
  receiving metric data values associated with a resource, each metric data value corresponds to a metric in a set of metrics stored in the computer-readable medium;
  calculating the set of correlation magnitudes, each correlation magnitude associated with a pair of metrics in the set of metrics; and
  storing the correlation magnitudes in the one or more computer-readable media.

12. The method of claim 11 wherein calculating the set of correlation magnitudes, each correlation magnitude associated with a pair of metrics in the set of metrics further comprises:
  for each pair of metrics in the set of metrics,
    calculating a correlation between a pair metrics based on the metric values associated with the pair of metrics;
    calculating an absolute value of each correlation to give a correlation magnitude associated with the pair of metrics; and
    storing a relation in the computer-readable medium that identifies the pair of metrics associated with the correlation magnitude.

13. The method of claim 8 further comprises repeatedly identifying the largest correlation magnitude, deleting the first or second metric from the set of metrics, and deleting the correlation magnitudes associated with which of the first or second metrics has the largest correlation magnitudes until the set of metrics is composed of a user-defined number of metrics.

14. The method of claim 8 further comprises repeatedly identifying the largest correlation magnitude, deleting the first or second metric from the set of metrics, and deleting the correlation magnitudes associated with which of the first or second metrics has the largest correlation magnitudes until the set of metrics reaches a user-defined minimum accuracy.

15. A non-transitory computer-readable medium encoded with machine-readable instructions that implement a method carried out by one or more processors of a computer system to perform the operations of
  receiving a set of metrics from a resource, each metric represents a measurable component of the resource;
  calculating a set of correlation magnitudes, each correlation magnitude calculated for a pair of metrics in the set of metrics stored in the one or more computer-readable media;
  identifying a largest correlation magnitude in the set of correlation magnitudes stored in the one or more computer-readable media;
  identifying a first metric and a second metric associated with the largest correlation magnitude;
  deleting one of the first and second metric from the set of metrics, based on which of the first and second metrics has larger correlation magnitudes with other metrics in the set of metrics; and
  deleting the correlation magnitudes associated with which of the first and second metrics has the largest correlation magnitudes from the set of correlation magnitudes.

16. The method of claim 15 wherein deleting the first or second metric from the set of metrics further comprises
  calculating a first sum of correlation magnitudes associated with the first metric;
  calculating a second sum of correlation magnitudes associated with the second metric;
  when the first sum is larger than the second sum, deleting the first metric from the set of metrics; and
  when the second sum is larger than the first sum, deleting the second metric from the set of metrics.

17. The medium of claim 15 wherein deleting the first or second metric from the set of metrics further comprises
  calculating a first average of correlation magnitudes associated with the first metric;

calculating a second average of correlation magnitudes associated with the second metric;

when the first average is larger than the second average, deleting the first metric from the set of metrics; and when the second average is larger than the first average, deleting the second metric from the set of metrics.

18. The medium of claim 15 further comprises:

receiving metric data values associated with a resource, each metric data value corresponds to a metric in a set of metrics stored in the computer-readable medium;

calculating the set of correlation magnitudes, each correlation magnitude associated with a pair of metrics in the set of metrics; and storing the correlation magnitudes in the one or more computer-readable media.

19. The medium of claim 18 wherein calculating the set of correlation magnitudes, each correlation magnitude associated with a pair of metrics in the set of metrics further comprises:

for each pair of metrics in the set of metrics, calculating a correlation between a pair metrics based on the metric values associated with the pair of metrics;

calculating an absolute value of each correlation to give a correlation magnitude associated with the pair of metrics; and storing a relation in the computer-readable medium that identifies the pair of metrics associated with the correlation magnitude.

20. The medium of claim 15 further comprises repeatedly identifying the largest correlation magnitude, deleting the first or second metric from the set of metrics, and deleting the correlation magnitudes associated with which of the first or second metrics has the largest correlation magnitudes until the set of metrics is composed of a user-defined number of metrics.

21. The medium of claim 15 further comprises repeatedly identifying the largest correlation magnitude, deleting the first or second metric from the set of metrics, and deleting the correlation magnitudes associated with which of the first or second metrics has the largest correlation magnitudes until the set of metrics reaches a user-defined minimum accuracy.

* * * * *